US010446017B1

(12) United States Patent
Gershoni et al.

(10) Patent No.: US 10,446,017 B1
(45) Date of Patent: Oct. 15, 2019

(54) SMART PERSONAL EMERGENCY RESPONSE SYSTEMS (SPERS)

(71) Applicants: Daniel Gershoni, Weston, FL (US); Farhad David Nosrati, Encino, CA (US)

(72) Inventors: Daniel Gershoni, Weston, FL (US); Farhad David Nosrati, Encino, CA (US)

( * ) Notice: Subject to any disclaimer, the term of this patent is extended or adjusted under 35 U.S.C. 154(b) by 0 days.

(21) Appl. No.: 16/234,512

(22) Filed: Dec. 27, 2018

(51) Int. Cl.
*G08B 25/01* (2006.01)
*H04W 4/029* (2018.01)
*G08B 21/04* (2006.01)
*H04W 4/90* (2018.01)

(52) U.S. Cl.
CPC ....... *G08B 25/016* (2013.01); *G08B 21/0453* (2013.01); *H04W 4/029* (2018.02); *H04W 4/90* (2018.02)

(58) Field of Classification Search
CPC . G08B 25/016; G08B 21/0453; H04W 4/029; H04W 4/90
See application file for complete search history.

(56) References Cited

U.S. PATENT DOCUMENTS

| | | | |
|---|---|---|---|
| 6,504,908 B1* | 1/2003 | Bellomo | H04M 11/04 379/38 |
| 9,177,459 B2 | 11/2015 | Sholder | |
| 9,734,690 B2 | 8/2017 | Haflinger et al. | |
| 10,044,857 B2* | 8/2018 | Philbin | G08B 25/016 |
| 2008/0001735 A1* | 1/2008 | Tran | G06F 19/3418 340/539.22 |
| 2011/0181422 A1* | 7/2011 | Tran | G06F 19/3418 340/573.1 |
| 2013/0100268 A1* | 4/2013 | Mihailidis | G08B 21/02 348/77 |
| 2017/0289350 A1* | 10/2017 | Philbin | G08B 25/016 |

\* cited by examiner

*Primary Examiner* — Joseph H Feild
*Assistant Examiner* — Rufus C Point

(57) ABSTRACT

A method and a smart personal emergency response system (SPERS) are provided for monitoring, analyzing, and communicating behavior of a user in emergency conditions and non-emergency conditions to multiple user devices. The SPERS has multiple sensors, an interactive communication unit (ICU), a non-transitory computer readable storage medium, and at least one data analytics processor having a data communication module, a control module, a behavioral analytics engine (BAE), and a notification module. Sensor data generated by the sensors is communicated to the user devices via one or more wireless communication links using the ICU. The ICU allows communication only on activation of an input means. The BAE dynamically analyzes the generated sensor data with one or more sensor data libraries in real-time for detecting behavior of the user in emergency conditions and transmits an analytics result to a virtual assistant application on the user devices.

31 Claims, 11 Drawing Sheets

SPERS HARDWARE ARCHITECTURE

STANDARD EMBODIMENT USING AM SOS BUTTON

OPTIONAL EMBODIMENT USING A TOUCH DISPLAY

FIG. 3    SPERS HARDWARE ARCHITECTURE

FIG. 4    PERS MAIN OPERATING LOOP

ANALYZE USER MOVEMENT BEHAVIOR / FALL DETECTION

GENERATE CUSTOM FALL DETECTION ALGORITHM AND UPLOAD NEW ALGORITHM TO SPERS

CREATE USER POST-FALL MOVEMENT
PROFILE AND TRANSMIT WIRELESSLY
TO OUTSIDE COMPUTERS AND
OPERATORS

FIG. 9  CHECK ON ME

SMART PERSONAL EMERGENCY RESPONSE SYSTEMS (SPERS)

CROSS-REFERENCE TO RELATED APPLICATIONS

The present Application claims the benefit of U.S. Provisional Patent Application No. 62/614,473 entitled "Smart Personal Emergency Response System" filed Jan. 7, 2018, the contents of which are incorporated in this disclosure by reference in their entirety.

FIELD OF THE INVENTION

The system disclosed herein, in general refers to a personal emergency response system. More particularly, the system disclosed herein relates to a smart personal emergency response system used for personal safety and security in both emergency conditions and non-emergency conditions.

BACKGROUND

In our country, the United States of America, most senior citizens live alone and require constant monitoring of vital activities for timely detection of abnormalities in health thereby resulting in less expensive interventions. Patients, especially, elderly patients require constant monitoring to avoid falls, for example, from walking or standing, from standing on supports, falls from sleeping or lying in a bed, falls from sitting on a chair, falls due to obstacles, etc. These falls cause drastic change in vital activities, for example, heart rate pattern, respiration rate pattern, etc., which can be one of the reasons for injury related deaths in the elderly patients. Sometimes, falls are caused by fluctuations in the vital activities of the elderly patients. Immediate detection and alerting of care providers on change in the vital activities of the elderly patients using monitoring systems is required for reducing long-term treatment costs and eliminating chances of injury related deaths in the elderly patients. In some conventional monitoring systems, the elderly patient is required to push a panic alert button, if the elderly patient needs help or has fallen. An elderly patient with a severe fatality may not be able to press the panic alert button after a fall and hence cannot alert the care provider, for example, a medical professional, a medical assistant, an emergency responder, etc.

Conventional monitoring systems comprising, for example, accelerometers, posture sensors, global positioning system devices, mechanical and sound alarms, microphone, etc., are typically wrapped around a user's body and are required to be worn throughout the day and night. Some conventional monitoring systems use only accelerometers that limit monitoring to only movements of an infant, a toddler, a pet, or an elderly patient by attachment of the monitoring system to their clothing or between sheets, blankets, etc., of a crib or a bed. If a user chooses not to wear the monitoring system around the user's body at all times, and the user encounters a fall or any other incident when the monitoring system is not worn, the fall could lead to a severe injury or death. Moreover, the majority of the conventional wearable monitoring systems, hereafter, referred to as personal emergency response systems require a user to push a panic alert button, if the user needs help or has fallen. When the user pushes the panic alert button on a conventional personal emergency response system, the conventional personal emergency response system transmits a signal to a predetermined receiver over a network. The receiver then assists the user until, for example, a medical professional, a medical assistant, an emergency responder, etc., arrives at the user's location. Users who experience a severe fall may not be able to press the panic alert button after the fall and hence cannot alert a respondent. Furthermore, conventional personal emergency response systems do not detect falls in real time, or predict a risk of a fall. There is a need for a personal emergency response system that monitors, dynamically analyzes behavior of a user, and communicates the analyzed behavior of the user to a receiver, for example, an emergency responder.

Some conventional personal emergency response systems use wireless radio frequency (RF) communication to connect with local communication equipment, for example, a base station connected to a telephone line. A user in an emergency condition may communicate with a receiver, a remote operator for help via the base station over the telephone line. However, the user may fail to communicate with the receiver in case of disruption of the telephone line and the RF communication. Some conventional personal emergency response systems use either Bluetooth® of Bluetooth Sig, Inc., or Wi-Fi® of Wi-Fi Alliance Corporation to directly contact an electronic device of a medical professional, a guardian, an emergency responder, a medical assistant, etc. Other conventional personal emergency response systems use Bluetooth® to connect to an electronic device, for example, a mobile phone, a laptop, a tablet, a personal computer, that is in close proximity, for example, upto 10 meters of the personal emergency response system. The user of the personal emergency response system, via the Bluetooth® connection establishes communication with a medical professional, a guardian, an emergency responder, a medical assistant, etc. However, on failure of the Bluetooth connection or the Wi-Fi connection in the conventional personal emergency response system, the user is left handicapped from contacting a receiver. There is a need for a personal emergency response system that communicates with a receiver using one or more modes of communication despite disruption in anyone of the communication modes.

Consider an example of a non-emergency scenario where constant monitoring of vital activities of elderly patients using a personal emergency response system is being performed. The sensors in the personal emergency response system sense vital parameters related to the vital activities of the elderly patient and the personal emergency response system transmits the sensed vital parameters to store in external storage devices or buffers for determining patterns in the parameters before and after the elderly patient suffers a fall using, for example, a fall detection algorithm. However, the transmission of the sensed vital parameters to the external storage devices has to be initiated by the elderly patient who might be incapable of doing so manually, for example, by press of a button. Furthermore, a receiver with an external device would like to check on the well-being of the elderly patient as a part of the constant monitoring of the vital activities of the elderly patient. There is a need for an intelligent interactive personal emergency response system that handles numerous functions, for example, transmits the sensed vital parameters to external storage devices on interaction of a user, such as, the elderly patient with the personal emergency response system via a graphical user interface or a voice command and also allows two way communication between the receiver and the user.

There are dozens of monitoring and communication devices. But, as discussed, none disclose the unique features of the present invention. Hence, there is a long felt need for a method and a personal emergency response system that monitors, dynamically analyzes, and communicates behavior of a user with external devices in emergency conditions and non-emergency conditions. Moreover, there is a need for a method and a personal emergency response system that has redundant communication modes for communicating with the external devices. Furthermore, there is a need for a method and a personal emergency response system that supports two way interaction of the user with the external devices and interaction of the user with the personal emergency response system via different input means.

SUMMARY

The smart personal emergency response system (SPERS) disclosed herein addresses the above recited need for monitoring, dynamically analyzing, and communicating behavior of a user in emergency conditions and non-emergency conditions to external devices. Furthermore, the SPERS disclosed herein addresses the above mentioned need for redundant communication modes for communicating with the external devices. Furthermore, the SPERS disclosed herein addresses the above mentioned need for supporting two way interaction of the user with the external devices and supporting interaction of the user with the SPERS via different input means, for example, a press of a button, a touch screen interface, a voice command, etc.

The smart personal emergency response system (SPERS) disclosed herein comprises multiple sensors, an interactive communication unit, a non-transitory computer readable storage medium, and at least one data analytics processor communicatively coupled to the non-transitory computer readable storage medium. The sensors, for example, a pulse sensor, a temperature sensor, an accelerometer, a gyroscope, a magnetometer, a proximity sensor, and multiple bio-monitoring electrodes, etc., are positioned within an enclosure of the SPERS to detect and track one or more vital activities of a user in emergency conditions and non-emergency conditions. The sensors generate sensor data associated with one or more vital activities of the user. The interactive communication unit comprises a speaker, a microphone, and a transceiver for communication of the user with the external devices via one or more wireless communication links. The SPERS allows the communication of the user with the external devices on activation of one of multiple input means, for example, a primary non-distress button, a secondary distress button, a touch screen interface, etc. The SPERS facilitates adjustment of sensitivity of the sensors via one of the input means, for example, the touch screen interface. In an embodiment, the SPERS performs sensitivity adjustment of the sensors automatically. The data analytics processor is operably coupled to the sensors and executes computer program instructions defined by multiple modules, namely, a data communication module, a control module, and a behavioral analytics engine. The data communication module receives an input from one of the input means and facilitates communication between the user device and the interactive communication unit. The control module activates and controls the interactive communication unit and the sensitivity of the sensors based on the received input. The behavioral analytics engine dynamically analyzes the generated sensor data with one or more sensor data libraries. Further, the data communication module transmits an analytics result of the dynamic analysis of the generated sensor data to a virtual assistant application deployed on the external devices and multiple data storage devices using the interactive communication unit at regular intervals.

It is an object of the present invention to provide a smart personal emergency response system for monitoring, analyzing, and communicating behavior of a user in emergency conditions and non-emergency conditions to a plurality of user devices, said smart personal emergency response system comprising: a plurality of sensors positioned within an enclosure of said smart personal emergency response system for detecting and tracking one or more vital activities of said user in said emergency and said non-emergency conditions and generating sensor data associated with said one or more vital activities of said user, wherein sensitivity of said sensors is adjustable; an interactive communication unit comprising a speaker, a microphone, and a transceiver for communication of said user with said user devices via one or more wireless communication links on activation of one of a plurality of input means comprising a primary non-distress button of said smart personal emergency response system; a non-transitory computer readable storage medium comprising a series of circular storage buffers for storing said generated sensor data with a time stamp and computer program instructions defined by modules of said smart personal emergency response system; at least one data analytics processor communicatively coupled to said non-transitory computer readable storage medium and operably coupled to said sensors, said at least one data analytics processor configured to execute said computer program instructions defined by said modules of said smart personal emergency response system, said modules comprising: a data communication module for receiving an input from one of said input means and facilitating said communication between said user device and said interactive communication unit; a control module for activating and controlling said interactive communication unit and said sensitivity of said sensors based on said received input; a behavioral analytics engine for dynamically analyzing said generated sensor data with one or more sensor data libraries in real-time for detecting said behavior of said user in said emergency conditions comprising a fall; and said data communication module for transmitting an analytics result of said dynamic analysis and said stored sensor data to a virtual assistant application deployed on one or more of said user devices and a plurality of data storage devices using said interactive communication unit of said smart personal emergency response system at regular intervals; said interactive communication unit including a virtual assistant avatar that activates the microphone and speaker, wirelessly connects to an outside computing device, establishes a two-way voice communication between the user and the virtual assistant avatar, utilizes speech to text algorithm to translate user communication to text, stores the user's text conversation, analyzes the user's text conversation, determines if human assistance is required, communicates with the user, providing assistance or comfort to the user until such assistance is no longer required; a primary alert button, said primary alert button capable of notifying outside operators and first responders during emergency situations; and a secondary alert button, said secondary alert button, after a user's fall has been detected, automatically activates the virtual assistant avatar to communicate with the user.

It is another object of the present invention to provide a smart personal emergency response system wherein said sensors comprise a pulse sensor, a temperature sensor, an accelerometer, a gyroscope, a magnetometer, a proximity sensor, and a plurality of bio-monitoring electrodes, or any combination thereof.

It is another object of the present invention to provide a smart personal emergency response system, wherein said sensor data selected from the group consisting of a heart rate, a respiration rate, speed of motion of said user, acceleration of said user, body temperature of said user, global positioning system co-ordinates of said user, and electrical activity of heart.

It is another object of the present invention to provide a smart personal emergency response system, further comprises a notification module for generating a notification associated with said analytics result, and wherein said generated notification is transmitted to said user devices by said data communication module.

It is another object of the present invention to provide a smart personal emergency response system, wherein said wireless communication links are selected from the group consisting of a radio frequency communication link, a cellular wireless network connection, a Bluetooth connection, and a wireless fidelity connection.

It is another object of the present invention to provide a smart personal emergency response system of claim 1, wherein said input means are a primary non-distress button, a secondary distress button, and a touch screen interface.

It is another object of the present invention to provide a smart personal emergency response system, wherein said interactive communication unit includes artificial intelligence.

It is another object of the present invention to provide a smart personal emergency response system, wherein said secondary alert button further comprises a dedicated wireless link.

It is another object of the present invention to provide a smart personal emergency response system, wherein said secondary alert button is manually activated by a user to communicate with the virtual assistant avatar, outside operators, and personal contacts.

It is another object of the present invention to provide a smart personal emergency response system, further comprising a proximity sensor, said proximity sensor detects the presence of an outside wireless computing device.

It is another object of the present invention to provide a smart personal emergency response system, further comprising a user authentication, said user authentication confirming the user using the device is the same user to whom the device is assigned.

It is another object of the present invention to provide a smart personal emergency response system, wherein said user authentication is a biometric.

It is another object of the present invention to provide a smart personal emergency response system for monitoring, analyzing, and communicating behavior of a user in emergency conditions and non-emergency conditions to a plurality of user devices, said smart personal emergency response system comprising: a plurality of sensors positioned within an enclosure of said smart personal emergency response system for detecting and tracking one or more vital activities of said user in said emergency and said non-emergency conditions and generating sensor data associated with said one or more vital activities of said user, wherein sensitivity of said sensors is adjustable; an interactive communication unit comprising a speaker, a microphone, and a transceiver for communication of said user with said user devices via one or more wireless communication links on activation of one of a plurality of input means comprising a primary non-distress button of said smart personal emergency response system; a non-transitory computer readable storage medium comprising a series of circular storage buffers for storing said generated sensor data with a time stamp and computer program instructions defined by modules of said smart personal emergency response system; at least one data analytics processor communicatively coupled to said non-transitory computer readable storage medium and operably coupled to said sensors, said at least one data analytics processor configured to execute said computer program instructions defined by said modules of said smart personal emergency response system, said modules comprising: a data communication module for receiving an input from one of said input means and facilitating said communication between said user device and said interactive communication unit; a control module for activating and controlling said interactive communication unit and said sensitivity of said sensors based on said received input; a behavioral analytics engine for dynamically analyzing said generated sensor data with one or more sensor data libraries in real-time for detecting said behavior of said user in said emergency conditions comprising a fall; said behavioral analytics engine, further comprising a record of behavior before, during, and after a user's fall that is used to generate a fall-detection algorithm and is used to create a post-fall profile that is shared with other computers and operators and to continually monitor and analyze the user's movement and thereby alerting third parties to the actual condition of the user, in real time; said data communication module for transmitting an analytics result of said dynamic analysis and said stored sensor data to a virtual assistant application deployed on one or more of said user devices and a plurality of data storage devices using said interactive communication unit of said smart personal emergency response system at regular intervals; and said interactive communication unit including a virtual assistant avatar that activates the microphone and speaker, wirelessly connects to an outside computing device, establishes a two-way voice communication between the user and the virtual assistant avatar, utilizes speech to text algorithm to translate user communication to text, stores the user's text conversation, analyzes the user's text conversation, determines if human assistance is required, communicates with the user, providing assistance or comfort to the user until such assistance is no longer required.

It is another object of the present invention to provide a smart personal emergency response system, wherein the post-fall analysis further comprises a pre-fall notification alert that is issued to the user.

It is another object of the present invention to provide a smart personal emergency response system, further comprising a pre-fall alert, wherein said pre-fall alert includes a post-fall analysis of behavior and actions prior to a confirmed fall-event, continuous monitoring to of the user's behavior, and issuance of a pre-fall alert to the user when the identical or nearly the same behaviors are beginning to exhibit themselves.

It is another object of the present invention to provide a smart personal emergency response system, further comprising a primary alert button, said primary alert button capable of notifying outside operators and first responders during emergency situations.

It is another object of the present invention to provide a smart personal emergency response system, further comprising a secondary alert button, said secondary alert button automatically activates, after a user's fall has been detected, the virtual assistant avatar to communicate with the user.

It is another object of the present invention to provide a smart personal emergency response system, wherein said secondary alert button further comprises a dedicated wireless link.

It is another object of the present invention to provide a smart personal emergency response system, wherein said secondary alert button is manually activated by a user to communicate with the virtual assistant avatar, outside operators, and personal contacts.

It is another object of the present invention to provide a smart personal emergency response system, further comprising a proximity sensor, said proximity sensor detects the presence of an outside wireless computing device.

It is another object of the present invention to provide a smart personal emergency response system, further comprising a user authentication, said user authentication confirming the user using the device is the same user to whom the device is assigned.

It is another object of the present invention to provide a smart personal emergency response system, wherein said user authentication is a biometric.

It is another object of the present invention to provide a smart personal emergency response system for monitoring, analyzing, and communicating behavior of a user in emergency conditions and non-emergency conditions to a plurality of user devices, said smart personal emergency response system comprising: a plurality of sensors positioned within an enclosure of said smart personal emergency response system for detecting and tracking one or more vital activities of said user in said emergency and said non-emergency conditions and generating sensor data associated with said one or more vital activities of said user, wherein sensitivity of said sensors is adjustable; an interactive communication unit comprising a speaker, a microphone, and a transceiver for communication of said user with said user devices via one or more wireless communication links on activation of one of a plurality of input means comprising a primary non-distress button of said smart personal emergency response system; a non-transitory computer readable storage medium comprising a series of circular storage buffers for storing said generated sensor data with a time stamp and computer program instructions defined by modules of said smart personal emergency response system; at least one data analytics processor communicatively coupled to said non-transitory computer readable storage medium and operably coupled to said sensors, said at least one data analytics processor configured to execute said computer program instructions defined by said modules of said smart personal emergency response system, said modules comprising: a data communication module for receiving an input from one of said input means and facilitating said communication between said user device and said interactive communication unit; a control module for activating and controlling said interactive communication unit and said sensitivity of said sensors based on said received input; a behavioral analytics engine for dynamically analyzing said generated sensor data with one or more sensor data libraries in real-time for detecting said behavior of said user in said emergency conditions comprising a fall; a primary alert button, said primary alert button capable of notifying outside operators and first responders during emergency situations; and a secondary alert button, said secondary alert button, after a user's fall has been detected, automatically activates the virtual assistant avatar to communicate with the user; and said behavior analytics engine monitors a user's movements, creates a user movement profile data, and stores the information in internal storage memory, said user movement profile data is transmitted to outside computing devices for analysis and for generation of a user fall algorithm, said user fall algorithm uploaded into the software of the present invention, said uploaded user fall algorithm is updated regularly and adapts to and changes with the user thereby providing a unique and customized algorithm for individual users based on the user's unique behavior movements and the analysis of the behavior analytics engine.

It is another object of the present invention to provide a smart personal emergency response system, wherein said behavioral analytics engine, further comprises a record of behavior before, during, and after a user's fall that is used to generate a fall-detection algorithm and is used to create a post-fall profile that is shared with other computers and operators and to continually monitor and analyze the user's movement and thereby alerting third parties to the actual condition of the user, in real time.

It is another object of the present invention to provide a smart personal emergency response system, wherein said behavioral analytics engine, further comprises identification of false falls and accurate identification of true falls to trigger accurate notification of a pre-fall condition.

It is another object of the present invention to provide a smart personal emergency response system, wherein said data communication module for transmitting an analytics result of said dynamic analysis and said stored sensor data to a virtual assistant application deployed on one or more of said user devices and a plurality of data storage devices using said interactive communication unit of said smart personal emergency response system at regular intervals.

It is another object of the present invention to provide a smart personal emergency response system, wherein said interactive communication unit including a virtual assistant avatar that activates the microphone and speaker, wirelessly connects to an outside computing device, establishes a two-way voice communication between the user and the virtual assistant avatar, utilizes speech to text algorithm to translate user communication to text, stores the user's text conversation, analyzes the user's text conversation, determines if human assistance is required, communicates with the user, providing assistance or comfort to the user until such assistance is no longer required.

It is another object of the present invention to provide a smart personal emergency response system, wherein said behavioral analytics engine, further comprising a record of behavior before, during, and after a user's fall that is used to generate a fall-detection algorithm and is used to create a post-fall profile that is shared with other computers and operators and to continually monitor and analyze the user's movement and thereby alerting third parties to the actual condition of the user, in real time.

It is another object of the present invention to provide a smart personal emergency response system, further comprising a proximity sensor, said proximity sensor detects the presence of an outside wireless computing device.

It is another object of the present invention to provide a smart personal emergency response system, further comprising a user authentication, said user authentication confirming the user using the device is the same user to whom the device is assigned.

It is another object of the present invention to provide a smart personal emergency response system, wherein said user authentication is a biometric.

BRIEF DESCRIPTION OF DRAWINGS

The aforementioned objects and advantages of the present invention, as well as additional objects and advantages thereof, will be more fully understood herein after as a result of a detailed description of a preferred embodiment when taken in conjunction with the following drawings, which are the purpose of illustration only and not limitation, and in which.

DETAILED DESCRIPTION OF INVENTION

Figure 1:
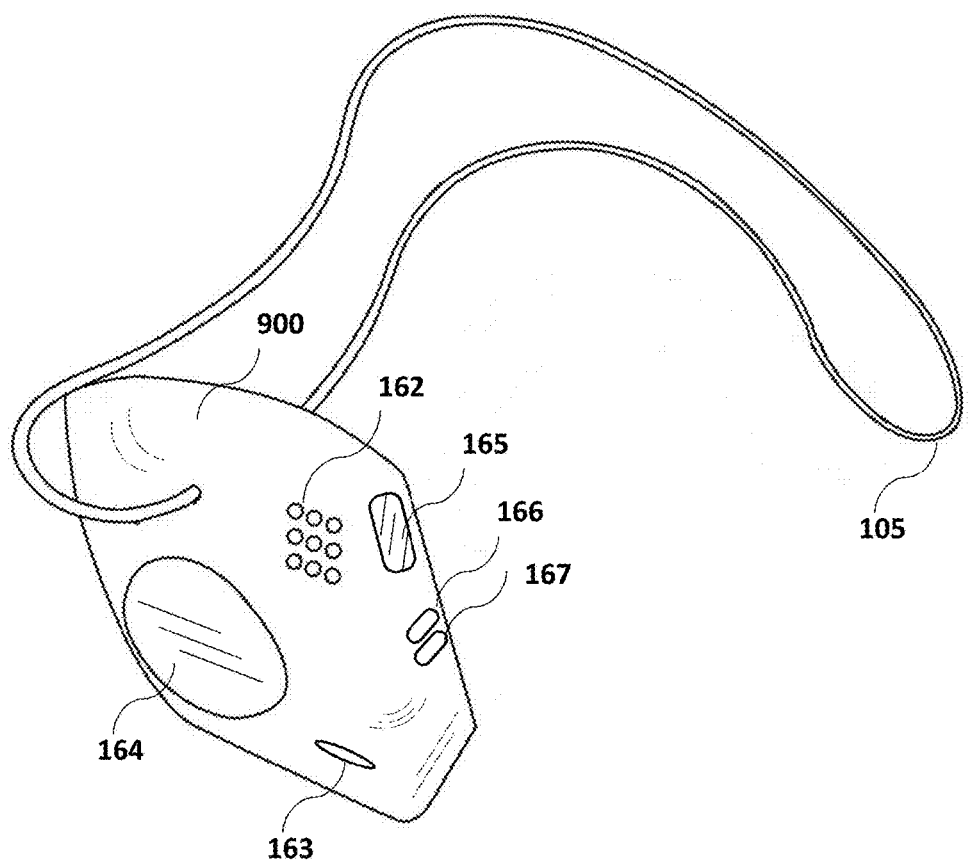
FIG. 1 is a top perspective view of a preferred embodiment of a smart personal emergency response system for monitoring, analyzing, and communicating behavior of a user in emergency conditions and non-emergency conditions to multiple user devices, in accordance with the present invention.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope, and contemplation of the present invention.

It should be noted that references to "an," "one," or "various" embodiments in this disclosure are not necessarily to the same embodiment, and such references contemplate more than one embodiment.

The present invention disclosed herein and illustrated in FIGS. 1 through 11 is Smart Personal Emergency Response System (SPERS) configured to communicating behavior of a user in emergency conditions and non-emergency conditions.

Unless otherwise defined, all terms of art, notations and other scientific terms or terminology used herein are intended to have the meanings commonly understood by those of skill in the art to which this invention pertains unless the context clearly indicates otherwise. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art, such as, for example, the widely utilized current Good Manufacturing Practice guidelines As used herein the term "Computing Device"" includes a desktop, laptop or tablet computer, as well as a mobile device FIG. 1 exemplarily illustrates a top perspective view of a smart personal emergency response system (SPERS) 100 for monitoring, analyzing, and communicating behavior of a user in emergency conditions and non-emergency conditions to multiple user devices. As used herein, "user" refers to an entity, for example, a baby, an elderly patient, a paralyzed person, etc., that is monitored using the SPERS 100. Also, as used herein, "emergency conditions" refer to conditions that cause severe symptoms in the user and may put the health of the user in serious risk, for example, a heart attack, a sudden fall, fainting, etc. Also, as used herein, "non-emergency conditions" refer to conditions of the user that do not require sudden medical attention, for example, routine activities of the user. The user devices are, for example, a laptop, a smart phone, a tablet, a computer, etc. As used herein, "behavior" refers to different vital parameters and trends in the vital parameters of the user in the emergency conditions and the non-emergency conditions. The SPERS 100 mainly comprises multiple sensors, an interactive communication unit, a non-transitory computer readable storage medium, and at least one data analytics processor. The SPERS 100 is a wearable device by means of a lanyard 105, a clip, etc., and is waterproof.

The multiple sensors are positioned within an enclosure 900 of the smart personal emergency response system (SPERS) 100 for detecting and tracking one or more vital activities of the user in the emergency and the non-emergency conditions. The sensors generate sensor data associated with the vital activities of the user. The sensors generate sensor data by detecting the vital parameters, and/or motion and/or position of the user. As used herein, "sensor data" refers to the analog output of the sensors in response to the detected and tracked vital activities of the user that is converted to digital domain. The sensors comprise, for example, a pulse sensor, a temperature sensor, an accelerometer such as a 3-axis accelerometer, a gyroscope such as a 3-axis gyroscope, a magnetometer such as a 3-axis magnetometer, a proximity sensor, multiple bio-monitoring electrodes, global positioning system (GPS) sensors, or any combination thereof. The temperature sensor, for example, a thermometer, measures body surface temperature of the user. The pulse sensor, also referred to as a "heart rate sensor" measures heart rate of the user, for example, based on a phenomenon that a light signal, when passing through tissues, acquires a pulsing nature due to a change of volume of an arterial bed with each heart contraction. The 3-axis accelerometer measures a projection of an apparent acceleration, that is, the difference between a true acceleration of the user and a gravitational acceleration. The 3-axis accelerometer tracks physical activity and movement of the user. The 3-axis gyroscope and the 3-axis magnetometer determine orientation of the user thereby determining motion and position of the user to monitor and analyze activities performed by the user. The GPS sensors obtain precise details on the position of the user using a network of orbiting satellites. The proximity sensor detects the presence of objects closer to the user without any physical contact between the user and the object. The proximity sensor guides the user to avoid obstacles in the direction of motion.

The bio-monitoring electrodes, that is, the electrocardiogram (ECG) sensors measure the electrical activity of the heart of the user generated by heart muscle depolarization. The heart muscle depolarization propagates in pulsating electrical waves towards skin of the user and is recorded by the bio-monitoring electrodes. The sensor data comprises the heart rate, the respiration rate, speed of motion of the user, acceleration of the user, body temperature of the user, GPS co-ordinates of the user, and electrical activity of heart of the user. In the enclosure 900, the SPERS 100 also comprises an analog to digital converter that digitizes the sensor data collected from the sensors that are in the form of electrical values.

The interactive communication unit of the smart personal emergency response system (SPERS) 100 comprises a speaker 162, a microphone 163, and a transceiver for communication of the user with the user devices via one or more wireless communication links. The SPERS 100 allows communication of the user with the user devices on activation of one of multiple input means. The wireless communication links used by the user of the SPERS 100 for communicating with the user devices are radio frequency (RF) communication link, cellular wireless network connection, Bluetooth® connection, wireless fidelity (Wi-Fi®) connection, or any combination thereof. The wireless communication is implemented using a combination of wireless communication protocols, for example, a Bluetooth® communication protocol, a Wi-Fi® communication protocol, etc. The SPERS 100 operates directly with a user device, for example, a smartphone using a Bluetooth® channel or a Wi-Fi® channel, provided there is a wireless network in the region of operation of the SPERS 100. In an embodiment, the SPERS 100 via the transceiver communicates with a local communication equipment, for example, a base station using a RF communication network. The base station is connected to a telecommunication circuit, for example, a telephone line that contacts a user device. The user device is in possession of a receiver, for example, a respondent, a medical professional, a guardian, an emergency responder, a medical assistant, etc. For the SPERS 100 to communicate with the user devices using the wireless communication links, the SPERS 100 requires the user to activate one or more input means.

The input means are, for example, a primary distress button 164, a secondary non-distress button 165, and a touch screen interface 161. On activation of the secondary non-distress button 165, the smart personal emergency response system (SPERS) 100 allows the user to communicate with a virtual assistant application deployed on a user device over a Bluetooth® connection or a radio frequency (RF) communication link. The secondary non-distress button 165 allows monitoring of the user by the receiver in non-emergency conditions via the interactive communication unit as disclosed in the detailed description of FIG. 10. In an embodiment, the activation of the secondary non-distress button 165 enables a dedicated wireless communication link, for example, a Bluetooth® connection alone or a RF communication link alone between the SPERS 100 and the user device. The virtual assistant application is remotely programmed to respond and communicate with the user of the SPERS 100 over the dedicated wireless communication link. In an embodiment, the virtual assistant monitoring application comprises an animated avatar with a capability to convert text to speech and speech to text for interactively communicating with the user and to monitor and triage the user. The virtual assistant avatar may also include artificial intelligence to analyze and triage the user, as well as communicate with the user and outside operators. Additionally, the secondary non-distress button may be manually activated by the user, such that the user may communicate with the virtual assistant avatar, an outside operator, and with personal contacts.

On activation of the primary distress button 164, as shown in FIG. 1 for example, a SOS button, the SPERS 100 connects to a receiver, for example, an emergency responder, a medical professional, a call center, etc., via a cellular wireless connection such as second generation (2G), third generation (3G), fourth generation (4G), and fifth generation (5G) or a Wi-Fi® connection. The primary distress button 164 allows direct communication of the user with the receiver in emergency conditions. On activation of the primary distress button 164, the SPERS 100, in an embodiment, gets connected to a local communication equipment, for example, a base station, to place a call or send a voice message via the interactive communication unit to the receiver, for example, police, emergency responders, a guardian, etc. A default mode of communication and name of a receiver, for example, a guardian is stored in the non-transitory computer readable storage medium of the SPERS 100. In an embodiment, the SPERS 100 provides an option to choose a receiver to receive a call from the user on activation of the primary distress button 164.

Figure 2:
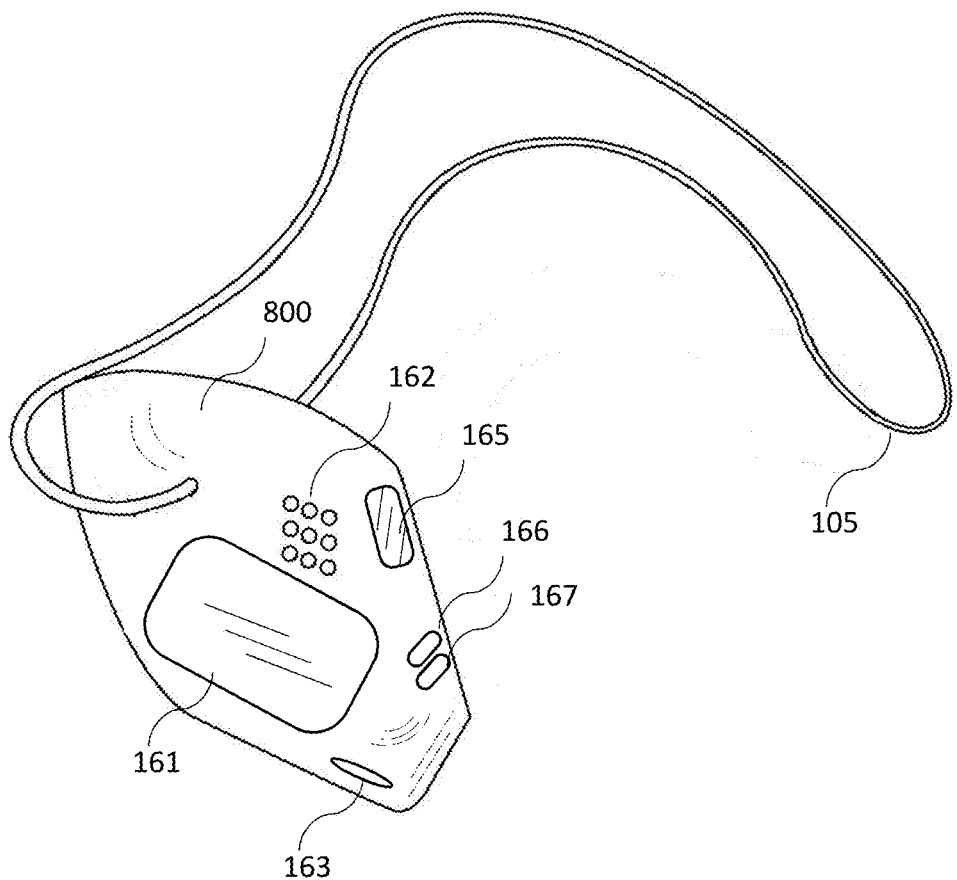
FIG. 2 is a top perspective view of a second embodiment of the smart personal emergency response system.

In an embodiment a touch screen interface 161 is provided on the enclosure 800 of the SPERS 100 as an input means for direct communication of the user with the receiver in emergency conditions as disclosed in the detailed description of FIG. 2. On activation of the primary distress touch screen 161, the SPERS 100, in an embodiment, gets connected to a local communication equipment, for example, a base station, to place a call or send a voice message via the interactive communication unit to the receiver, for example, police, emergency responders, a guardian, etc.

The speaker 162 is an output device in the smart personal emergency response system (SPERS) 100 and the speaker 162 is communicatively coupled to the data analytics processor via an audio codec. The audio codec is used as an analog-to-digital converter of electric signals received from the microphone 163 and as a digital-to-analog converter for electric signals transmitted to the speaker 162. The speaker 162 transforms an electric analog signal to a sound wave. The speaker 162 works in a broad range of resonant frequencies to obtain high sound quality. In an embodiment, the speaker 162 plays audio content, for example, from a flash memory of a user device or a remote interface device, for example, a smartphone, a tablet, a personal computer, a minicomputer, etc., over the wireless communication links, or from a flash memory of a local memory unit of the SPERS 100, or from a flash memory of a terminal device, for example, a base station using the radio frequency (RF) communication. The audio output of the speaker 162 is controlled using volume control buttons 166 and 167 provided on the enclosure 900 of the SPERS 100. In an embodiment, the volume control buttons 166 and 167 allow the user to adjust sensitivity of the sensors in the SPERS 100. The volume control button 166 increases the volume of an audio played on the speaker and the volume control button 167 decreases the volume of the audio played on the speaker. In an embodiment, the volume control button 166 increases the sensitivity of the sensors and the volume control button 167 decreases the sensitivity of the speaker.

The microphone 163 of the smart personal emergency response system (SPERS) 100 is an input means to directly interact with a receiver using the user device. The microphone 163 receives an ambient sound frame from the microphone 163 and transmits to the user device. The microphone 163 transforms sound to an analog electric signal. The microphone 163 is highly sensitive and implements an extraneous noise suppression technology. The SPERS 100 implements a software protocol for online transmission of sound packets to the user device from the microphone 163. The SPERS 100 further comprises a battery that is an autonomous sustainable source of electric energy. The battery is operably coupled to the data analytics processor, the sensors, and the interactive communication unit for powering the data analytics processor, the sensors, the interactive communication unit.

The smart personal emergency response system (SPERS) 100 further comprises a non-transitory computer readable storage medium, for example, a series of circular storage buffers for storing the generated sensor data with a time stamp and computer program instructions defined by modules of the SPERS 100. The circular storage buffer is a fixed size buffer for easy buffering of data streams, for example, the generated sensor data. A first circular buffer contains continuously generated sensor data, for example, data related to motion of the user, such as, speed of motion of the user. Once the first circular buffer is filled to a predetermined buffer length, the first circular buffer is looped back and the newly generated sensor data is over written over the existing generated sensor data in the buffer. A second circular buffer contains sensor data, for example, data related to motion of user, such as, the speed of motion of the user, after an emergency condition, for example, a fall. The sensor, for example, the 3-axis accelerometer, detects an occurrence of a fall of the user and triggers the data analytics processor to store the generated sensor data after the fall in the second circular buffer. The stored sensor data before the fall of the user and after the fall of the user are transmitted to the user devices over the wireless communication links for monitoring the behavior of the user in real time. In an embodiment, the stored sensor data before the fall of the user and after the fall of the user are continuously transmitted to multiple storage devices, for example, cloud based storage servers over the wireless communication links.

The data analytics processor of the smart personal emergency response system (SPERS) 100 is communicatively coupled to the non-transitory computer readable storage medium, for example, the series of circular buffers and is operably connected to the sensors. The data analytics processor executes computer program instructions defined by the modules comprising a behavior analytics engine, a data communication module, a control module, and a notification module. The data communication module receives an input from one of the input means, for example, the secondary non-distress button 165, the primary distress button 164, the touch screen interface 161, etc., and facilitates communication between the user device and the interactive communication unit. In an embodiment, the input to the SPERS 100 is received by the interactive communication unit of the SPERS 100 from a virtual assistant application deployed on the user device. The input from the virtual assistant application comprises, for example, modes for activating and controlling operability and sensitivity of the sensors, the microphone 163, and the speaker 162, etc. The virtual assistant application is configured, for example, as a mobile application or a desktop application. The virtual assistant application can be deployed on user devices that execute operating systems of different types, for example, the Android® operating system of Google Inc., the iOS operating system of Apple Inc., the Windows Phone® operating system of Microsoft Corporation, etc.

The control module activates and controls the interactive control unit, comprising the microphone 163 and the speaker 162, and adjusts the sensitivity of the sensors based on the received input. The control module activates and deactivates the microphone 163 and the speaker 162 based on the activation of the input means, for example, the secondary non-distress button 165 and the primary distress button 164 positioned on the enclosure 900 of the smart personal emergency response system (SPERS) 100. In an embodiment, the control module activates and deactivates the microphone 163 and the speaker 162 based on instructions received from the user device via a graphical user interface (GUI) provided by the virtual assistant application deployed on the user device. In an embodiment, the control module receives a selection of modes of operation of the SPERS 100, for example, the modes of operation of the sensors, and activates the sensors to measure one or more vital parameters of the user. The modes of operation comprise, for example, activation of the sensors for measurement and updating of the vital parameters of the user with a certain regularity, activation of the sensors for measurement and updating of the vital parameters of the user based on a measurement request received from the virtual assistant application deployed on the user device, and activation of the sensors for measurement and transmitting the vital parameters of the user to the user device in real time.

In an embodiment, the data communication module of the smart personal emergency response system (SPERS) 100 receives a check-on-me input from the virtual assistant application on the user device at regular intervals. The check-on-me input is in the form of an audio alert played on the speaker 162, or a message displayed on the touch screen interface 161 of the SPERS 100 during non-emergency conditions. The user responds to the check-on-me input via the interactive communication unit on activating the secondary non-distress button 165 as disclosed in the detailed description of FIG. 9.

The behavior analytics engine dynamically analyzes the generated sensor data with one or more sensor data libraries in real-time for detecting an emergency condition, for example, a fall based on the behavior of the user. The behavior analytics engine filters and processes the sensor data generated by the sensors to detect an occurrence of an emergency condition, for example, a fall using the sensor data libraries. The sensor data libraries are collections of sensor data that are classified under different categories, for example, data under non-emergency conditions, data under emergency conditions, data for different age groups, data for different sensors, data for different classes of ailments of the user of the smart personal emergency response system (SPERS) 100, or any combination thereof, etc. The behavior analytics engine compares the generated sensor data of the user with the corresponding data in the sensor data libraries to detect occurrence of an emergency condition. Consider, for example, the data from the 3-axis accelerometer such as speed of motion is tracked for a 55 year old diabetes male patient. To analyze and detect if the patient has had a fall, the behavioral analytics engine of the SPERS 100 compares the speed of motion of the patient with the speed of motion of a 55 year old diabetes male user in the sensor data libraries corresponding to a 3-axis accelerometer. If the tracked speed of motion of the patient varies with respect to the data in the sensor data libraries, the behavioral analytics engine identifies a likelihood of a fall of the patient.

The behavior analytics engine implements a fall detect algorithm by working in co-ordination with the 3-axis accelerometer, the 3-axis gyroscope, and the 3-axis magnetometer in the SPERS 100. The 3-axis accelerometer detects abrupt acceleration and deceleration that occurs during a fall of the user. The behavior analytics engine is robust to spurious detection of fall of the user. In an embodiment, the data communication module of the smart personal emergency response system (SPERS) 100 outputs the generated sensor data of the 3-axis accelerometer, the 3-axis gyroscope, and the 3-axis magnetometer to an external logger through a Bluetooth® connection for analysis and characterization of the non-emergency conditions and the emergency conditions such as falls.

The data communication module transmits an analytics result of the dynamic analysis and the stored sensor data to the data storage devices, for example, the cloud based servers and the virtual assistant application deployed on the user devices using the interactive communication unit at regular intervals. As used herein, "analytics result" refers to an identification of an emergency condition that the user is in based on the dynamic analysis of the sensor data. In an embodiment, the data communication module transmits the analytics result to the touch screen interface 161 of the smart personal emergency response system (SPERS) 100 as disclosed in the detailed description of FIG. 2.

The notification module generates a notification associated with the analytics result and the data communication module transmits the generated notification to the user devices. The notifications are in multiple formats, for example, audio notifications via the speaker 101 of the smart personal emergency response system (SPERS) 100, an alerting indication on the touch screen interface 161 of the SPERS 100. In an embodiment, the notification module generates a text message as a notification in the virtual assistant application deployed on the user devices.

The smart personal emergency response system (SPERS) 100 allows web based monitoring of the behavior of the user using user devices based on the transmitted sensor data before and after an occurrence of an emergency condition, for example, a fall and the sensor data that led to the emergency condition. With the processing power of the user devices, a best-suited analysis and profiling algorithm for the transmitted sensor data is determined by the medical professional, the emergency responder, etc. The web based monitoring is feasible since the SPERS 100 supports the wireless communication links, for example, Bluetooth® communication, Wi-Fi® communication, cellular wireless communication such as second generation (2G), third generation (3G), etc. The SPERS 100 creates a log of vital parameters of the user using the sensors with a time stamp and transmits to the user devices, for different purposes, for example, profiling, analytics, alerting, etc.

In an embodiment, the proximity sensor in the smart personal emergency response system (SPERS) 100 enable identification or authentication of the user to access external devices, for example, a medication dispensing device. The proximity sensor in the SPERS 100 ensures that only authorized users gain access to the medication dispensed by the medication dispensing device. The proximity sensor in the SPERS 100 also restricts entry of the user to areas marked as dangerous in the surroundings of the user, for example, a fire place, a balcony, a staircase, etc., by activating the primary distress button 164.

FIG. 2 exemplarily illustrates a top perspective view of an embodiment of the smart personal emergency response system (SPERS) 100. In this embodiment, the SPERS 100 comprises a touch screen interface 161. In an embodiment, the touch screen interface 161 functions as a primary distress button 164 in emergency conditions of the user. On activation of the touch screen interface 161 in the emergency conditions, the user can communicate with a receiver, for example, an emergency responder, etc., over a cellular wireless connection such as second generation (2G), third generation (3G), fourth generation (4G), and fifth generation (5G) or a Wi-Fi® connection. In an embodiment, the touch screen interface 161 functions as a display unit in co-ordination with the secondary non-distress button 165. The analytics result transmitted by the data communication module is rendered on the touch screen interface 161 as disclosed in the detailed description of FIG. 1. In an embodiment, the touch screen interface 161 provides options to the user to adjust the sensitivity of the sensors, the speaker 162, and the microphone 163. The touch screen interface 161 allows the receiver, for example, the emergency responder, the guardian, etc., to interactively communicate with the user by means of text messages, audio recordings, etc.

Figure 3:
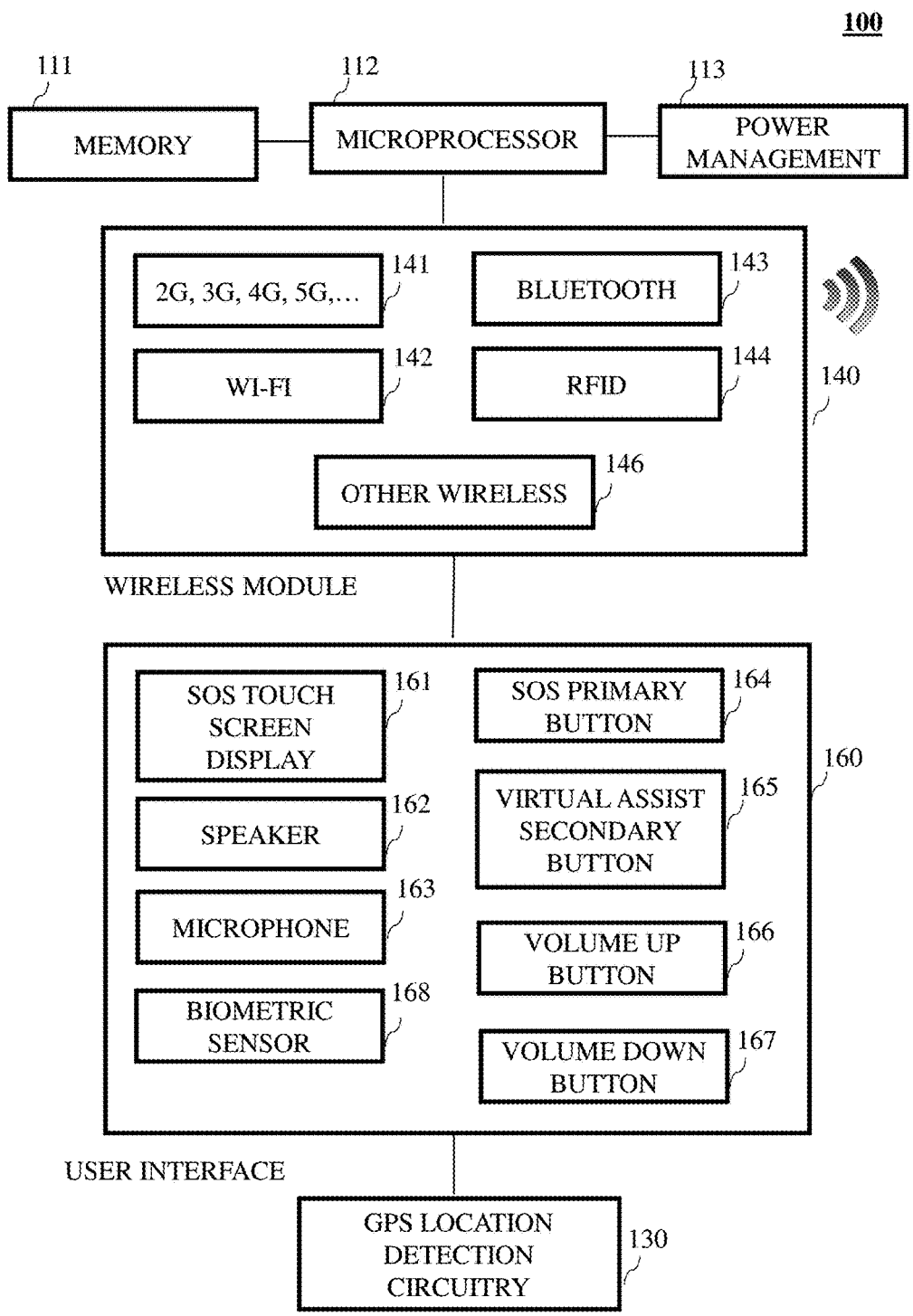
FIG. 3 is a diagram of the architecture of the internal hardware of the present invention.

FIG. 3, wherein a microprocessor 112 provides the computing power, Memory module 111, provides storage area for the recorded user movement information, power management 113 contains a rechargeable battery that provides the power source for the SPERS 100. Wireless module 140 communicates with the outside operators and computing systems using 2G, 3G, 4G and 5G cellular communication 141, Wi-Fi communication 142, Bluetooth communication 143, RFID communication 144, in addition to other wireless communications 146. User Interface module 100, includes primary SOS touch screen 161, speaker 162, Microphone 163, SOS primary button 164, virtual assist secondary button 165, volume up 166, volume down 167 and biometric sensor 168. GPS location detection circuitry 130, provides location positioning of the SPERS 100 to the remote operators.

Figure 4:
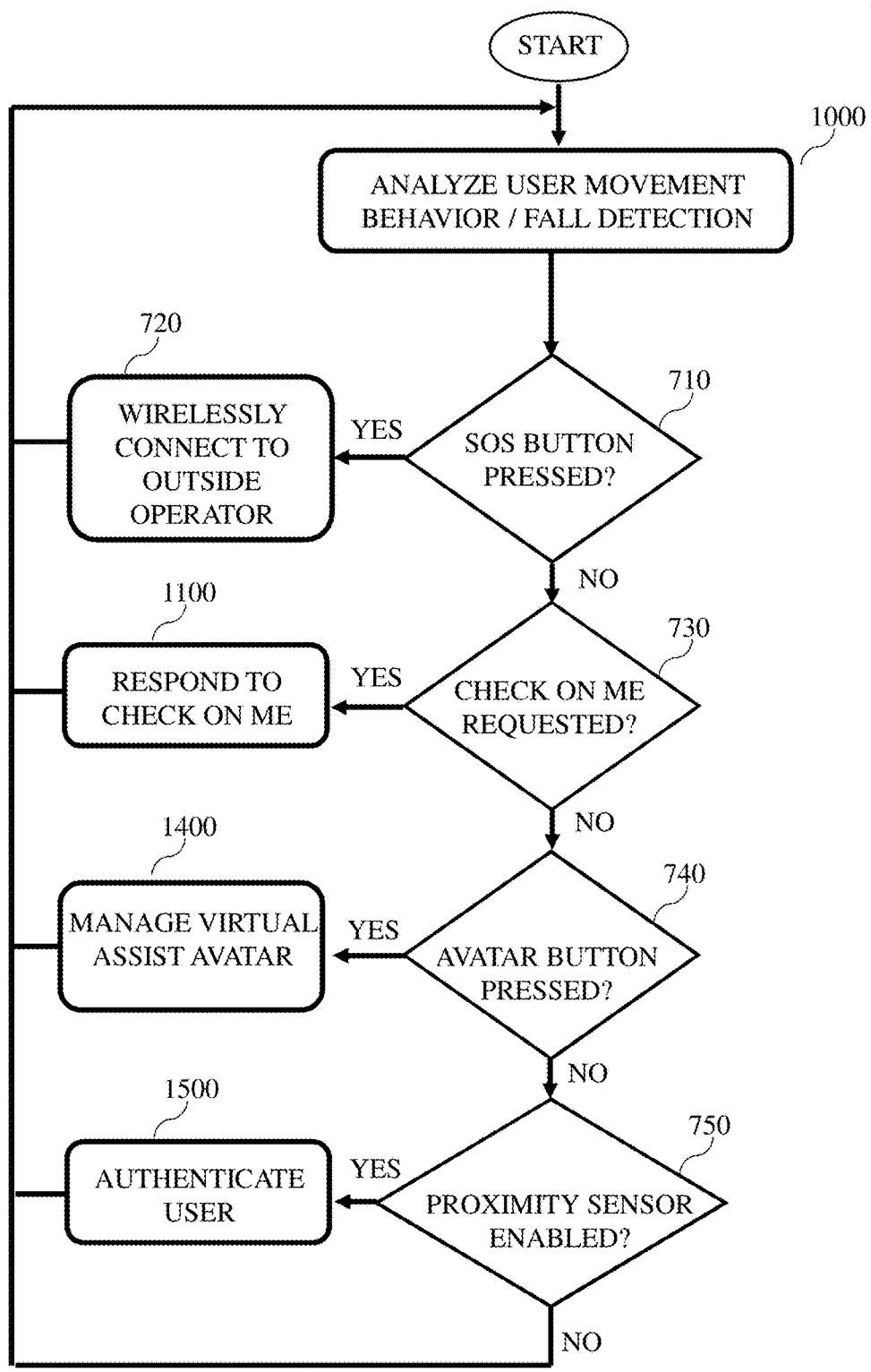
FIG. 4 is a block diagram of the main operating loop of the present invention.

Referring now to FIG. 4, there is shown the present invention has a main operating loop software flow diagram 700. Analyze user movement behavior/fall detection 1000, constantly monitors and records user movements and notifies emergency operators and caregiver in the event a fall has occurred. Next status of primary SOS button is checked 710, and in the event the SOS button is pressed, current invention SPERS 100 wirelessly connects to outside operators 720. Next, if a Check On Me request is received 730, the user then is notified to respond to Check On Me 1100. The next stage, status of Avatar Assist Button is checked 740, and in the event the button has been pressed, Manage Virtual Assist Avatar 1400 provides interactive wireless communication between the user and the virtual assist avatar on the outside computing device. Furthermore, the status of Proximity Sensor is checked 750, and if it is enabled, the user is the authenticated 1500.

Figure 5:
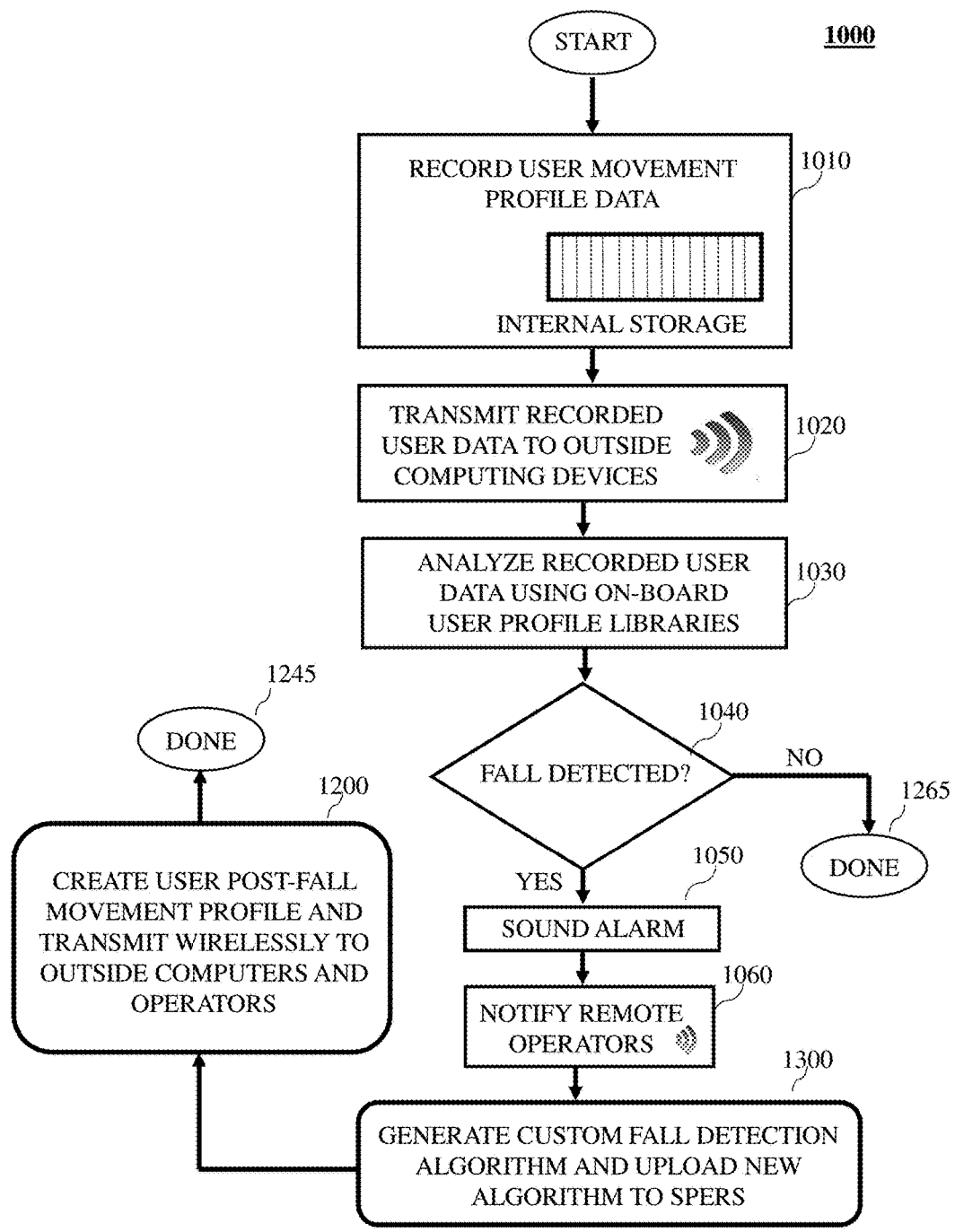
FIG. 5 is a block diagram detail of the analysis of the movement behavior or fall detection of the present invention.

Referring to FIG. 5, there is shown a detail of software flow diagram to Analyze User Movement Behavior/Fall Detection 1000. User movement profile data is recorded 101. The recorded data is then wirelessly transmitted to outside computing devices for further analysis 1020. Next, current inventions SPERS 100 analyzes the recorded movement data utilizing previously stored software libraries and templates representing user behavior 1030 to determine if a fall has occurred 1040. In case of a fall, alarm is sounded 1050, and remote operators are notified 1060. Optimized fall detection algorithms generated by outside computing devices is then uploaded into the current invention SPERS 100 to allow for a more accurate future fall detection by customizing the fall detection for the current user 1300. Following the detection of a fall, the user post-fall movement data is then recorded and in addition, the data is wirelessly transmitted to outside operators, first responders and computing devices to notify them of the user condition immediately after the fall has occurred.

Figure 6:
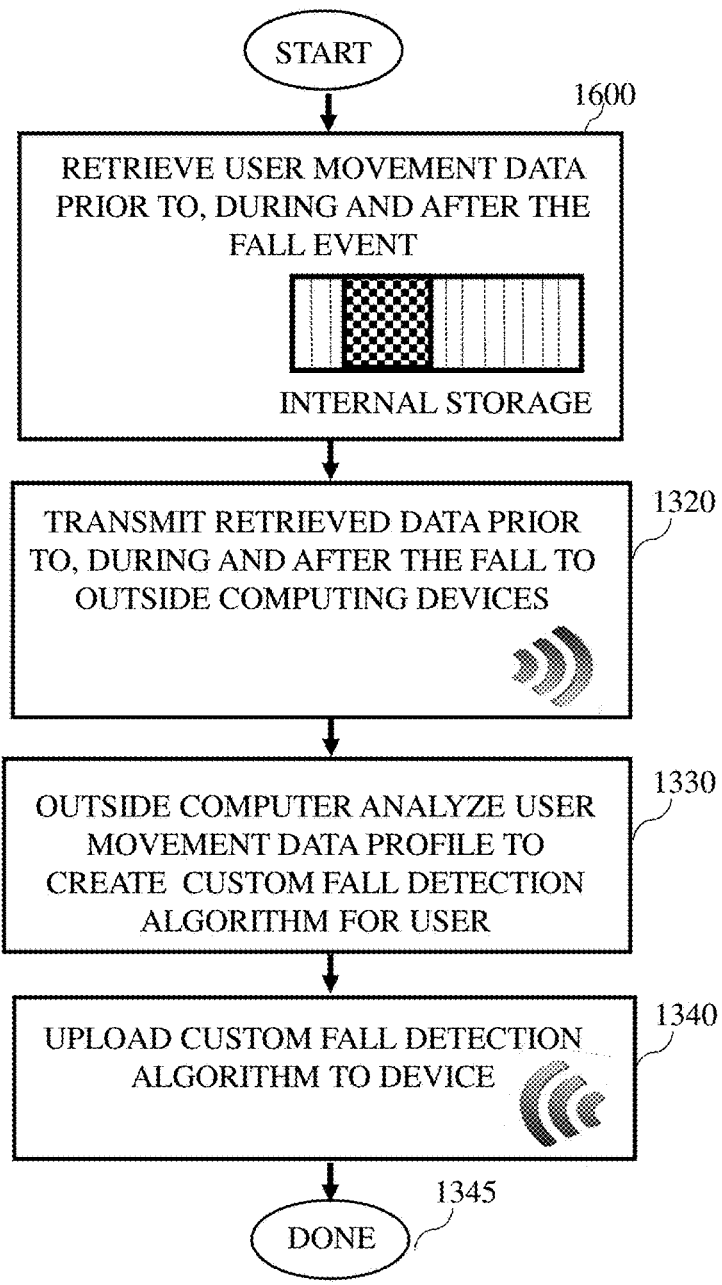
FIG. 6 is a block diagram of the creation and uploading of a custom fall detection algorithm for a particular patient of the present invention.

Referring to FIG. 6, there is shown a detail of software flow diagram to generate custom fall detection algorithms by outside computing devices 1300, and upload the customized algorithms to current inversion SPERS 100. User movement data prior to, during and after the fall is retrieved from on-board memory 1600. The retrieved user data is then wirelessly transmitted to outside computing devices with access to more processing power and software resources 1320. Outside computing devices then utilize their expanded software and hardware capabilities to further analyze user data and create a more accurate customized fall detection algorithm 1330. The newly created custom fall detection algorithms are then uploaded 1345, into current invention SPERS 100.

Figure 7:
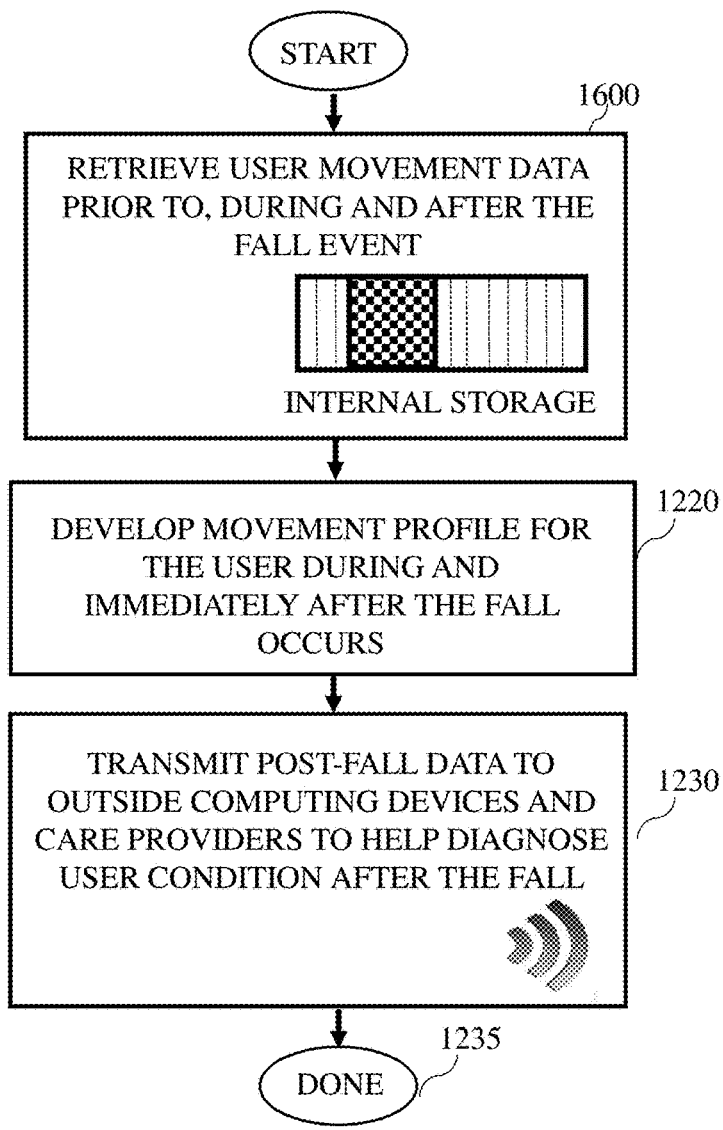
FIG. 7 is a block diagram detail of the creation and transmission of a profile of the post-fall movement of the patient of the present invention.

Referring to FIG. 7, there is shown a detail of software flow diagram to create user post-fall movement profile and wirelessly transmitting that information to outside computing devices and operators 1200. User movement data prior to, during and after the fall is retrieved from on-board memory 1600. The retrieved data is then utilized to create user movement profile during and immediately after the fall occurs 1220. Post-fall data is the wirelessly transmitted to outside resources for example emergency operators, caregivers, first responders and outside computing devices to notify them of the user condition following the fall 1230.

Figure 8:
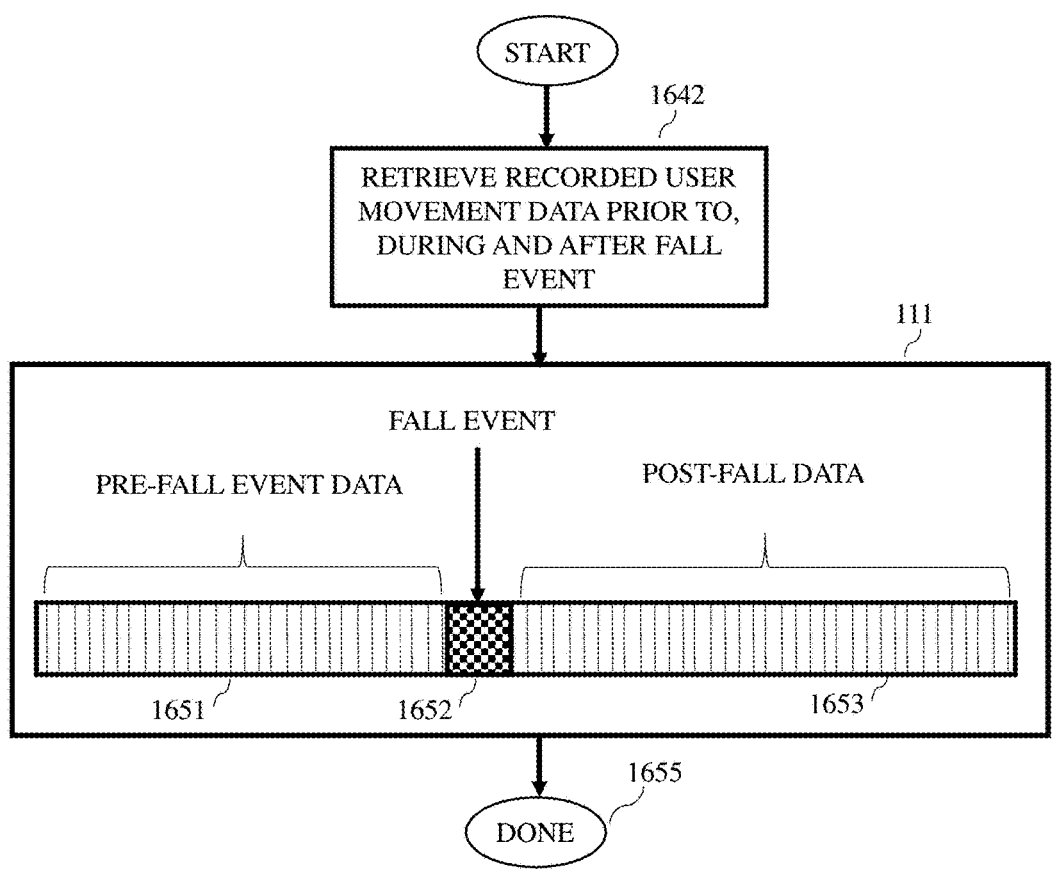
FIG. 8 is a block diagram detail of the retrieval of patient movement information occurring before, during, and after a fall, in accordance with the present invention.

Referring to FIG. 8, there is shown a detail of retrieving user movement data prior, during and after the fall 1600. Memory module 111, contains the recorded movement data prior to the fall 1651, during the fall 1652 as well as after the fall 1653.

Figure 9:
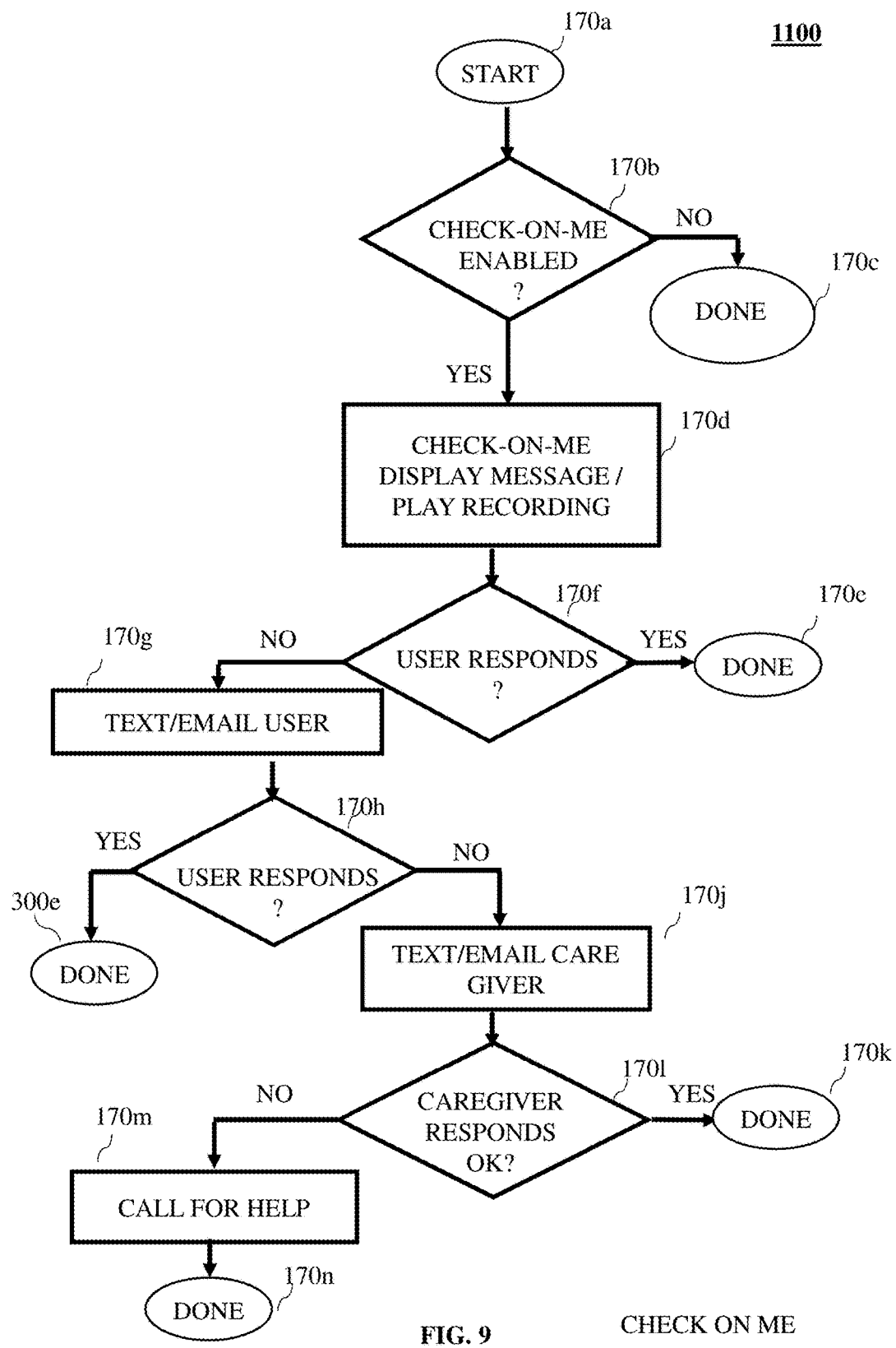
FIG. 9 is a block diagram detail of the Check On Me feature of the present invention.

Referring now to FIG. 9, there is shown the SPERS 100 Check-On-Me process 1100. The Check-On-Me process 1100 begins with a continuous check as to whether the process is enabled 170b. If it is not, then the process is done 170c. If the process 1100 is enabled, then both display message 170d and call for help 170m are activated. If the user responds 170f to the display message 170d, then the process 1100 is complete. If the user doesn't respond 170f, then a text, email, or call is placed to the user 170g. If the user responds 170h at this point, then the process is done 300e. If the user hasn't responded 170h, then a text, email or call is placed to the caregiver 170j. The process then awaits a response from the care giver at 1701. If the care giver responds, then the process 1100 is done 170k. If the care giver doesn't respond, then a call for help 170m is followed through to provide help and assistance to the patient who has been unable to respond.

Figure 10:
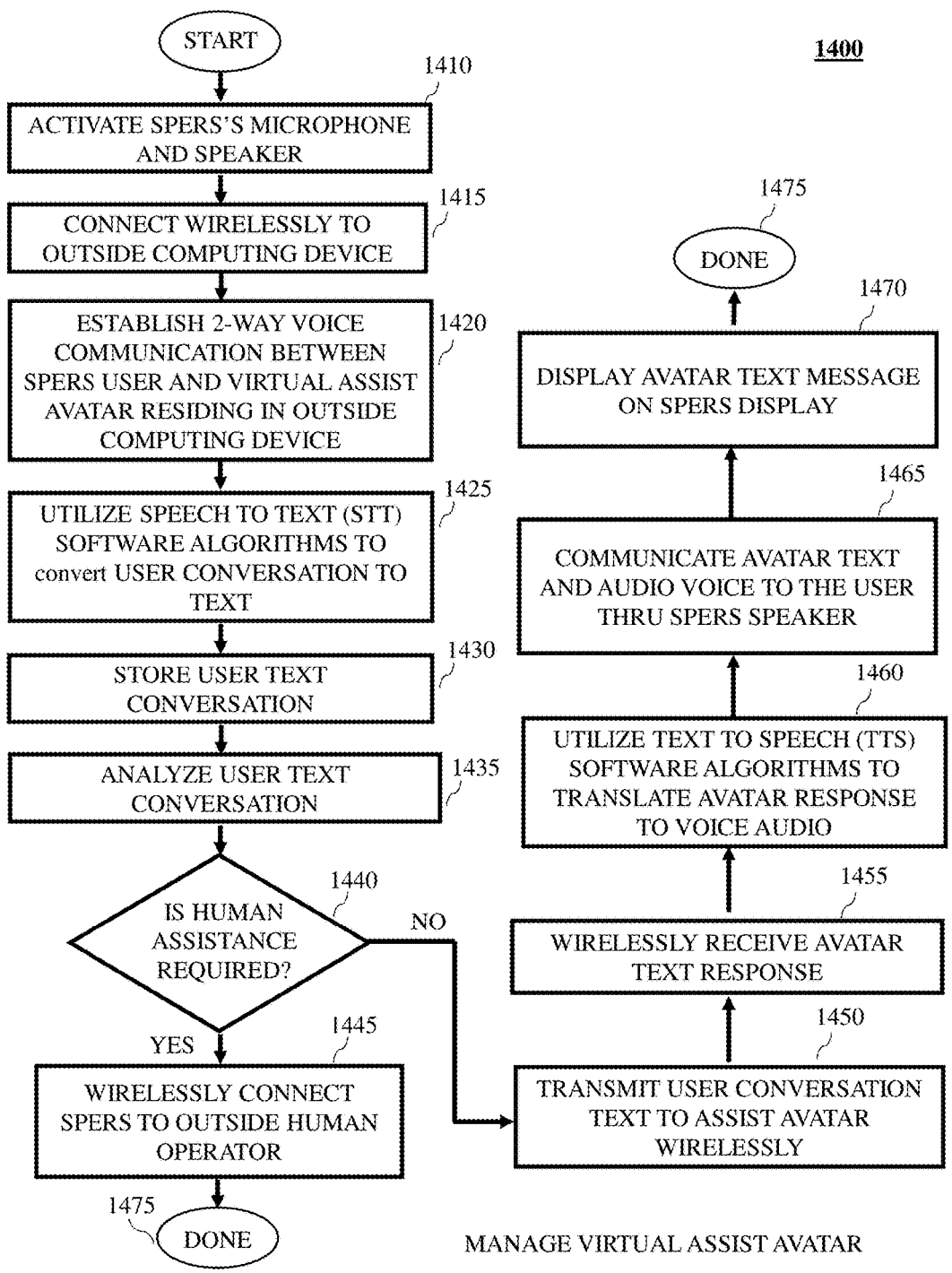
FIG. 10 is a block diagram detail of the virtual assist avatar of the present invention.

Referring to FIG. 10, there is shown a detail on steps performed by the virtual assistant application on a user device in coordination with the smart personal emergency response system (SPERS) 100 for monitoring behavior of a user of the SPERS 100 and communicating with the user in non-emergency conditions. Initially speaker 162 and microphone 163 are activated 1410. Next, SPERS 100 is wirelessly connected to outside computing device with Virtual Assist Avatar 1415. Next, 2-way voice communication is established between the virtual assist avatar and the user 1420. User conversation is converted to text by utilizing Speech To Text (STT) technology 1425 and the resulting text information is stored 1430, in the memory module 111. User text information is then analyzed 1435 by onboard microprocessor 112. In case a Human Assistance is required 1440, SPERS 100 is wirelessly connected to outside operator 1445. In the event that no human assistance is required, User text conversation is wirelessly transmitted to outside computing device with virtual assist avatar 1450. The User text information is then analyzed by outside computing device and the Text of virtual assist avatar's response is then wirelessly transmitted back 1455 to current invention SPERS 100 and converted to speech utilizing Text To Speech (TTS) technology 1460. The audio speech information on Avatar response is then communicated to the user 1465 via the speaker 162. The text information on Avatar speech is then displayed 1470 on the SPERS 100 Display unit 161.

Figure 11:
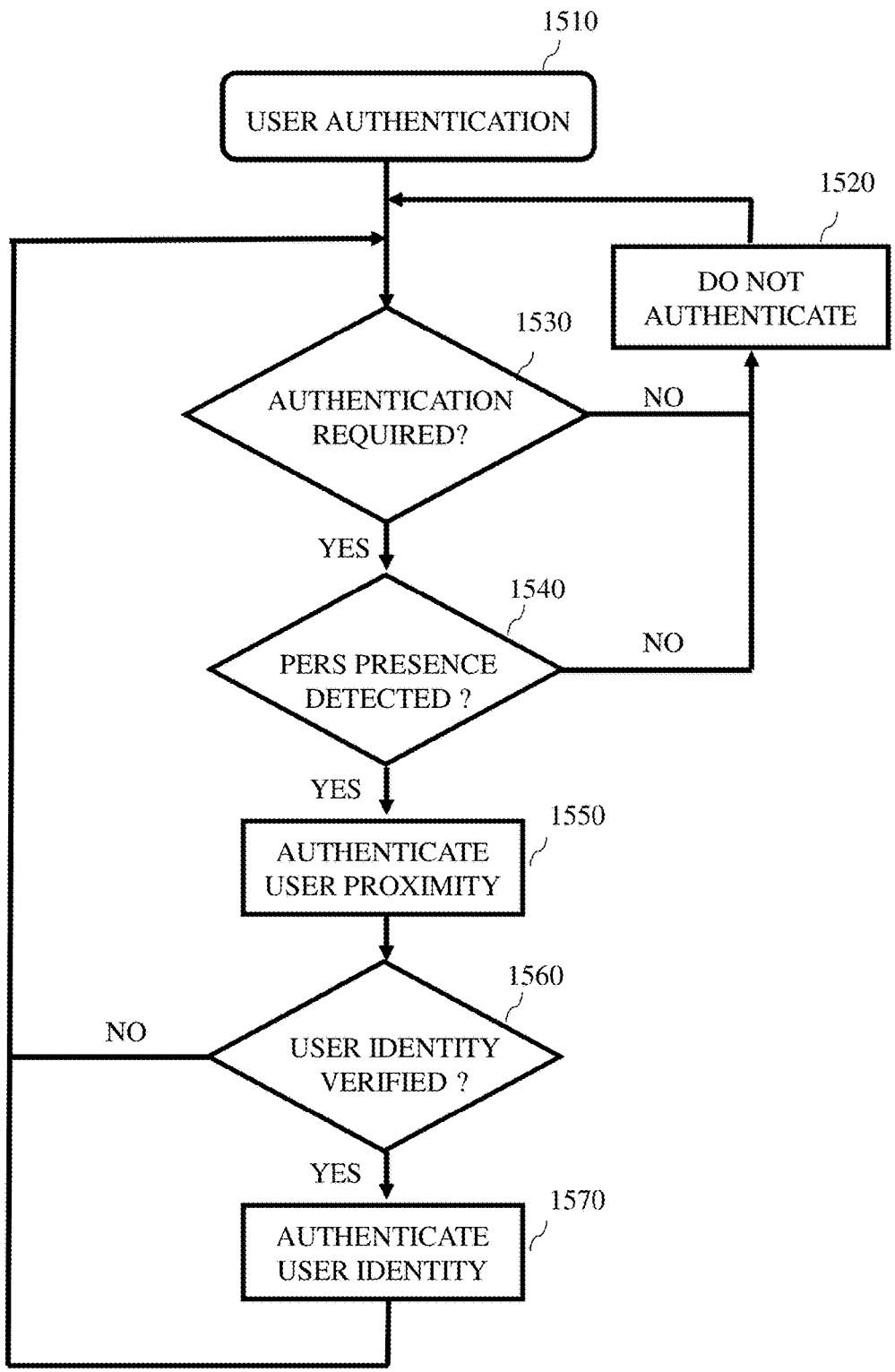
FIG. 11 is a block diagram detail of the authenticate user of the present invention.

Referring to FIG. 11, there is shown a detail of Authenticate User 1500. In the event that User Authentication is required 1530, then SPERS 100 utilizes its Bluetooth 143, RFID 144 and Wi-Fi 142 wireless modules to detect the presence of the PERS near an outside wireless computing device such as a mobile phone. In the event that user presence is successfully detected, then the User Proximity is Authenticated 1550, otherwise the user is not authenticated to the outside wireless device 1520. Once User proximity is authenticated, SPERS 100, utilizes its biometric sensing module 168, to authenticate User Identity 1570.

Unless otherwise defined, all terms of art, notations and other scientific terms or terminology used herein are intended to have the meanings commonly understood by those of skill in the art to which this invention pertains unless the context clearly indicates otherwise. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art, such as, for example, the widely utilized current good manufacturing practice guidelines.

The foregoing examples have been provided merely for the purpose of explanation and are in no way to be construed as limiting of the smart personal emergency response system (SPERS) 100 and the method performed by the SPERS 100 disclosed herein. While the SPERS 100 and the method performed by the SPERS 100 have been described with reference to various embodiments, it is understood that the words, which have been used herein, are words of description and illustration, rather than words of limitation. Further, although the SPERS 100 and the method performed by the SPERS 100 have been described herein with reference to particular means, materials, and embodiments, the SPERS 100 and the method performed by the SPERS 100 are not intended to be limited to the particulars disclosed herein; rather, the SPERS 100 and the method performed by the SPERS 100 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the SPERS 100 and the method performed by the SPERS 100 disclosed herein in their aspects.

We claim:

1. A smart personal emergency response system for monitoring, analyzing, and communicating behavior of a user in emergency conditions and non-emergency conditions to a plurality of user devices, said smart personal emergency response system comprising:

a. a plurality of sensors positioned within an enclosure of said smart personal emergency response system for detecting and tracking one or more vital activities of said user in said emergency and said non-emergency conditions and generating sensor data associated with said one or more vital activities of said user, wherein sensitivity of said sensors is adjustable;

b. an interactive communication unit comprising a speaker, a microphone, and a transceiver for communication of said user with said user devices via one or more wireless communication links on activation of one of a plurality of input means comprising a primary non-distress button of said smart personal emergency response system;

c. a non-transitory computer readable storage medium comprising a series of circular storage buffers for storing said generated sensor data with a time stamp and computer program instructions defined by modules of said smart personal emergency response system;

d. at least one data analytics processor communicatively coupled to said non-transitory computer readable storage medium and operably coupled to said sensors, said at least one data analytics processor configured to execute said computer program instructions defined by said modules of said smart personal emergency response system, said modules comprising:

e. a data communication module for receiving an input from one of said input means and facilitating said communication between said user device and said interactive communication unit;

f. a control module for activating and controlling said interactive communication unit and said sensitivity of said sensors based on said received input;

g. a behavioral analytics engine for dynamically analyzing said generated sensor data with one or more sensor data libraries in real-time for detecting said behavior of said user in said emergency conditions comprising a fall; and h. said data communication module for transmitting an analytics result of said dynamic analysis and said stored sensor data to a virtual assistant application deployed on one or more of said user devices and a plurality of data storage devices using said interactive communication unit of said smart personal emergency response system at regular intervals;

i. said interactive communication unit including a virtual assistant avatar that activates the microphone and speaker, wirelessly connects to an outside computing device, establishes a two-way voice communication between the user and the virtual assistant avatar, utilizes speech to text algorithm to translate user communication to text, stores the user's text conversation, analyzes the user's text conversation, determines if human assistance is required, communicates with the user, providing assistance or comfort to the user until such assistance is no longer required;

j. a primary alert button, said primary alert button capable of notifying outside operators and first responders during emergency situations; and k. a secondary alert button, said secondary alert button, after a user's fall has been detected, automatically activates the virtual assistant avatar to communicate with the user.

2. The smart personal emergency response system of claim 1, wherein said sensors comprise a pulse sensor, a temperature sensor, an accelerometer, a gyroscope, a magnetometer, a proximity sensor, and a plurality of bio-monitoring electrodes, or any combination thereof.

3. The smart personal emergency response system of claim 1, wherein said sensor data selected from the group consisting of a heart rate, a respiration rate, speed of motion of said user, acceleration of said user, body temperature of said user, global positioning system co-ordinates of said user, and electrical activity of heart.

4. The smart personal emergency response system of claim 1, further comprises a notification module for generating a notification associated with said analytics result, and wherein said generated notification is transmitted to said user devices by said data communication module.

5. The smart personal emergency response system of claim 1, wherein said wireless communication links are selected from the group consisting of a radio frequency communication link, a cellular wireless network connection, a Bluetooth connection, and a wireless fidelity connection.

6. The smart personal emergency response system of claim 1, wherein said input means are a primary non-distress button, a secondary distress button, and a touch screen interface.

7. The smart personal emergency response system of claim 1, wherein said interactive communication unit includes artificial intelligence.

8. The smart personal emergency response system of claim 1, wherein said secondary alert button further comprises a dedicated wireless link.

9. The smart personal emergency response system of claim 1, wherein said secondary alert button is manually activated by a user to communicate with the virtual assistant avatar, outside operators, and personal contacts.

10. The smart personal emergency response system of claim 1, further comprising a proximity sensor, said proximity sensor detects the presence of an outside wireless computing device.

11. The smart personal emergency response system of claim 1, further comprising a user authentication, said user authentication confirming the user using the device is the same user to whom the device is assigned.

12. The smart personal emergency response system of claim 1, wherein said user authentication is a biometric.

13. A smart personal emergency response system for monitoring, analyzing, and communicating behavior of a user in emergency conditions and non-emergency conditions to a plurality of user devices, said smart personal emergency response system comprising:

a. a plurality of sensors positioned within an enclosure of said smart personal emergency response system for detecting and tracking one or more vital activities of said user in said emergency and said non-emergency conditions and generating sensor data associated with said one or more vital activities of said user, wherein sensitivity of said sensors is adjustable;

b. an interactive communication unit comprising a speaker, a microphone, and a transceiver for communication of said user with said user devices via one or more wireless communication links on activation of one of a plurality of input means comprising a primary non-distress button of said smart personal emergency response system;

c. a non-transitory computer readable storage medium comprising a series of circular storage buffers for storing said generated sensor data with a time stamp and computer program instructions defined by modules of said smart personal emergency response system;

d. at least one data analytics processor communicatively coupled to said non-transitory computer readable storage medium and operably coupled to said sensors, said at least one data analytics processor configured to execute said computer program instructions defined by said modules of said smart personal emergency response system, said modules comprising:
e. a data communication module for receiving an input from one of said input means and facilitating said communication between said user device and said interactive communication unit;
f. a control module for activating and controlling said interactive communication unit and said sensitivity of said sensors based on said received input;
g. a behavioral analytics engine for dynamically analyzing said generated sensor data with one or more sensor data libraries in real-time for detecting said behavior of said user in said emergency conditions comprising a fall;
h. said behavioral analytics engine, further comprising a record of behavior before, during, and after a user's fall that is used to generate a fall-detection algorithm and is used to create a post-fall profile that is shared with other computers and operators and to continually monitor and analyze the user's movement and thereby alerting third parties to the actual condition of the user, in real time;
i. said data communication module for transmitting an analytics result of said dynamic analysis and said stored sensor data to a virtual assistant application deployed on one or more of said user devices and a plurality of data storage devices using said interactive communication unit of said smart personal emergency response system at regular intervals; and
j. said interactive communication unit including a virtual assistant avatar that activates the microphone and speaker, wirelessly connects to an outside computing device, establishes a two-way voice communication between the user and the virtual assistant avatar, utilizes speech to text algorithm to translate user communication to text, stores the user's text conversation, analyzes the user's text conversation, determines if human assistance is required, communicates with the user, providing assistance or comfort to the user until such assistance is no longer required.

14. The smart personal emergency response system of claim 13, wherein the post-fall analysis further comprises a pre-fall notification alert that is issued to the user.

15. The smart personal emergency response system of claim 13, further comprising a pre-fall alert, wherein said pre-fall alert includes a post-fall analysis of behavior and actions prior to a confirmed fall-event, continuous monitoring to of the user's behavior, and issuance of a pre-fall alert to the user when the identical or nearly the same behaviors are beginning to exhibit themselves.

16. The smart personal emergency response system of claim 13, further comprising a primary alert button, said primary alert button capable of notifying outside operators and first responders during emergency situations.

17. The smart personal emergency response system of claim 13, further comprising a secondary alert button, said secondary alert button automatically activates, after a user's fall has been detected, the virtual assistant avatar to communicate with the user.

18. The smart personal emergency response system of claim 13, wherein said secondary alert button further comprises a dedicated wireless link.

19. The smart personal emergency response system of claim 13, wherein said secondary alert button is manually activated by a user to communicate with the virtual assistant avatar, outside operators, and personal contacts.

20. The smart personal emergency response system of claim 13, further comprising a proximity sensor, said proximity sensor detects the presence of an outside wireless computing device.

21. The smart personal emergency response system of claim 13, further comprising a user authentication, said user authentication confirming the user using the device is the same user to whom the device is assigned.

22. The smart personal emergency response system of claim 13, wherein said user authentication is a biometric.

23. A smart personal emergency response system for monitoring, analyzing, and communicating behavior of a user in emergency conditions and non-emergency conditions to a plurality of user devices, said smart personal emergency response system comprising:
a. a plurality of sensors positioned within an enclosure of said smart personal emergency response system for detecting and tracking one or more vital activities of said user in said emergency and said non-emergency conditions and generating sensor data associated with said one or more vital activities of said user, wherein sensitivity of said sensors is adjustable;
b. an interactive communication unit comprising a speaker, a microphone, and a transceiver for communication of said user with said user devices via one or more wireless communication links on activation of one of a plurality of input means comprising a primary non-distress button of said smart personal emergency response system;
c. a non-transitory computer readable storage medium comprising a series of circular storage buffers for storing said generated sensor data with a time stamp and computer program instructions defined by modules of said smart personal emergency response system;
d. at least one data analytics processor communicatively coupled to said non-transitory computer readable storage medium and operably coupled to said sensors, said at least one data analytics processor configured to execute said computer program instructions defined by said modules of said smart personal emergency response system, said modules comprising:
e. a data communication module for receiving an input from one of said input means and facilitating said communication between said user device and said interactive communication unit;
f. a control module for activating and controlling said interactive communication unit and said sensitivity of said sensors based on said received input;
g. a behavioral analytics engine for dynamically analyzing said generated sensor data with one or more sensor data libraries in real-time for detecting said behavior of said user in said emergency conditions comprising a fall;
h. a primary alert button, said primary alert button capable of notifying outside operators and first responders during emergency situations; and
i. a secondary alert button, said secondary alert button, after a user's fall has been detected, automatically activates the virtual assistant avatar to communicate with the user; and
j. said behavior analytics engine monitors a user's movements, creates a user movement profile data, and stores the information in internal storage memory, said user movement profile data is transmitted to outside computing devices for analysis and for generation of a user fall algorithm, said user fall algorithm uploaded into the software of the present invention, said uploaded user fall algorithm is updated regularly and adapts to and changes with the user thereby providing a unique and customized algorithm for individual users based on the user's unique behavior movements and the analysis of the behavior analytics engine.

24. The smart personal emergency response system of claim 23, wherein said behavioral analytics engine, further comprises a record of behavior before, during, and after a user's fall that is used to generate a fall-detection algorithm and is used to create a post-fall profile that is shared with other computers and operators and to continually monitor and analyze the user's movement and thereby alerting third parties to the actual condition of the user, in real time.

25. The smart personal emergency response system of claim 23, wherein said behavioral analytics engine, further comprises identification of false falls and accurate identification of true falls to trigger accurate notification of a pre-fall condition.

26. The smart personal emergency response system of claim 23, wherein said data communication module for transmitting an analytics result of said dynamic analysis and said stored sensor data to a virtual assistant application deployed on one or more of said user devices and a plurality of data storage devices using said interactive communication unit of said smart personal emergency response system at regular intervals.

27. The smart personal emergency response system of claim 23, wherein said interactive communication unit including a virtual assistant avatar that activates the microphone and speaker, wirelessly connects to an outside computing device, establishes a two-way voice communication between the user and the virtual assistant avatar, utilizes speech to text algorithm to translate user communication to text, stores the user's text conversation, analyzes the user's text conversation, determines if human assistance is required, communicates with the user, providing assistance or comfort to the user until such assistance is no longer required.

28. The smart personal emergency response system of claim 23, wherein said behavioral analytics engine, further comprising a record of behavior before, during, and after a user's fall that is used to generate a fall-detection algorithm and is used to create a post-fall profile that is shared with other computers and operators and to continually monitor and analyze the user's movement and thereby alerting third parties to the actual condition of the user, in real time.

29. The smart personal emergency response system of claim 23, further comprising a proximity sensor, said proximity sensor detects the presence of an outside wireless computing device.

30. The smart personal emergency response system of claim 23, further comprising a user authentication, said user authentication confirming the user using the device is the same user to whom the device is assigned.

31. The smart personal emergency response system of claim 23, wherein said user authentication is a biometric.

* * * * *